May 5, 1936.  R. H. FLOWERS  2,040,044
PLOW
Filed Oct. 24, 1935  2 Sheets-Sheet 1
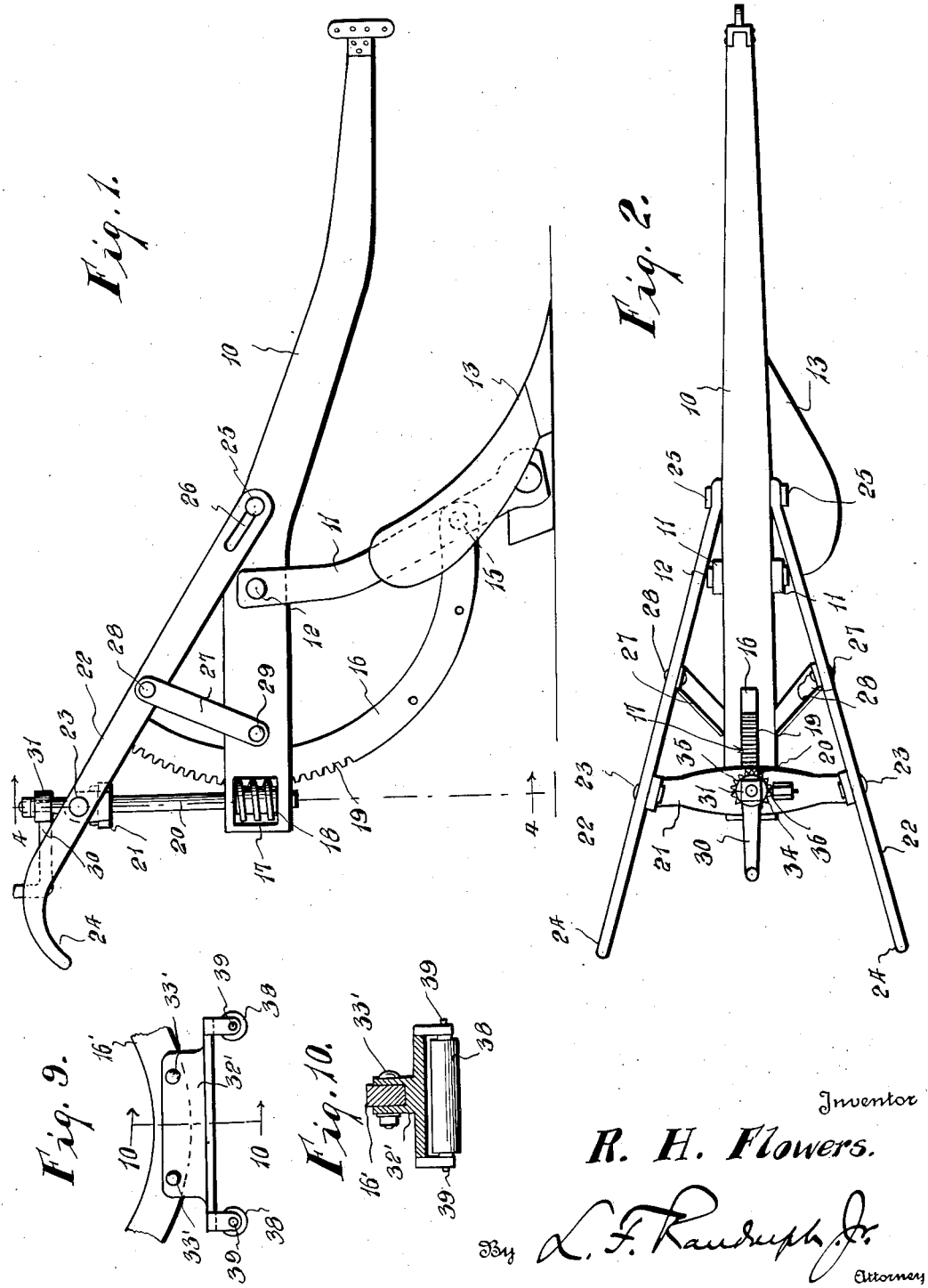
Inventor
R. H. Flowers.
By L. F. Randolph, Jr.
Attorney May 5, 1936.  R. H. FLOWERS  2,040,044
PLOW
Filed Oct. 24, 1935  2 Sheets—Sheet 2
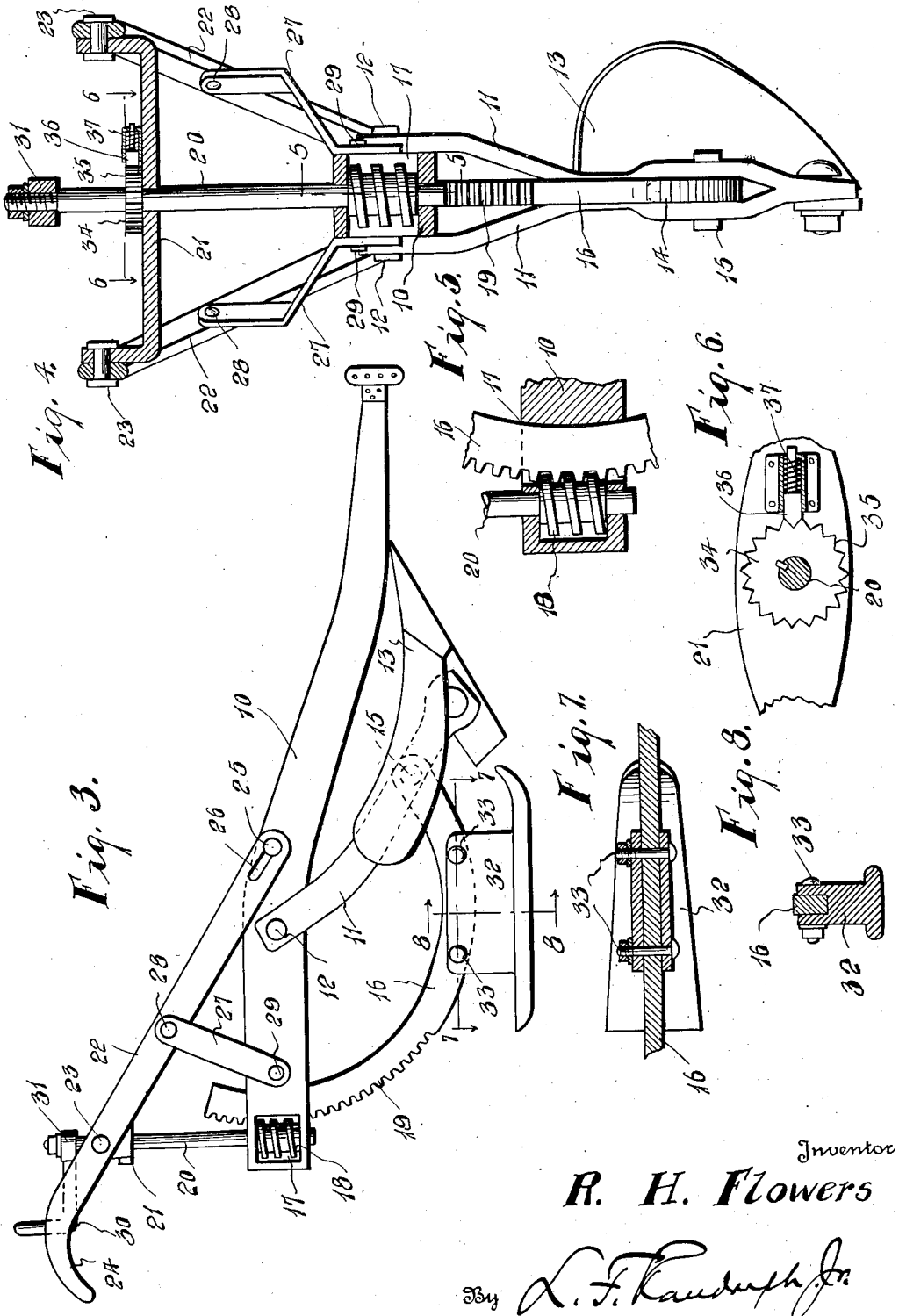
Inventor
R. H. Flowers Patented May 5, 1936

2,040,044

UNITED STATES PATENT OFFICE 2,040,044

PLOW

Russell H. Flowers, Holland, Ky., assignor of one-fourth to Fred N. Lewis, Burkesville, Ky., and one-fourth to Clarence Lewis, Waterview, Ky.

Application October 24, 1935, Serial No. 46,585

7 Claims. (Cl. 97—109)

This invention relates to a plow, and its primary purpose is to provide a novel and more efficient construction which may be set at any desired angle without having to re-set the usual clevis pin in the back band on the harness of the draft animal.

It is also aimed to provide such a construction which may be adjusted to any desired position without the necessity of stopping the team or draft animals, in order that plowing may be done at different depths even in the same field.

It is further aimed to provide a novel construction wherein a shoe is provided for sliding engagement over the ground as the plow is drawn to and from the field.

The more specific objects and advantages will in part be pointed out and otherwise become apparent from a consideration of the description hereinafter following, taken in connection with accompanying drawings illustrating an operative embodiment.

In said drawings:—

Figure 1 is a side elevation of the plow;

Figure 2 is a plan view thereof;

Figure 3 is a side elevation of the plow with the share in elevated position;

Figure 4 is a vertical sectional view taken on the line 4—4 of Figure 1;

Figure 5 is a vertical sectional view taken on the line 5—5 of Figure 4;

Figure 6 is a horizontal sectional view taken on the line 6—6 of Figure 4;

Figure 7 is a horizontal sectional view taken on the line 7—7 of Figure 3;

Figure 8 is a vertical sectional view taken on the line 8—8 of Figure 3;

Figure 9 is a fragmentary elevation of a modified form of shoe; and

Figure 10 is a detail section taken on the line 10—10 of Figure 9.

Referring specifically to the drawings, wherein like reference characters designate like or similar parts, 10 designates a longitudinally disposed beam at opposite sides of which a pair of depending arms 11 are pivoted at 12, and carry a suitable or conventional plow share at 13.

Said arms 11 are separated at a portion 14 and therein is pivoted by means of a removable bolt 15, the forward end of an arcuate bar 16.

The upper end of the arcuate bar 16 extends through a slot 17 in the rear portion of the beam 10. In a cut-away portion 17 at the rear of said beam 10, is a worm 18 enmeshed with gear teeth 19 on the arcuate bar 16. Worm 18 is rigid on a shaft 20 which is vertically disposed and journaled in the beam 10, and also in a transverse bar 21, which bar 21 also serves as a brace or connecting means for handlebars 22, being riveted or bolted thereto as at 23. Grips 24 are formed at the rear end of the handlebars, and the handles diverge forwardly and are connected to the beam 10 at their front end by means of a bolt adjustably passing through elongated slots 26 in the handles. Links 27 may be connected to the handles 22 as at 28, and to the beam 10 as at 29.

A crank 30 is provided at the upper end of the shaft 20, being movably attached thereon as at 31.

As a result of the construction described, it will be realized that the crank 31 may be turned in order to rotate shaft 20 and through the gearings 18—19, move bar 16 upwardly or downwardly, and accordingly swing the arms 11 and the plow share 13 to any desired height, whereby the depth of cut of the plow may be regulated, even while the plow is in operation. It will be realized that the crank 31 is in the most advantageous position with respect to the grips 24 to enable such adjustment or variation of the height of the plow while plowing is actualy in progress.

While the plow is being moved to and from the field, the share 13 is preferably elevated as shown in Figure 3, and a shoe 32 is adapted to contact the ground, support the entire plow to avoid wear on any of the operating parts, and is adapted to be drawn along the ground. This shoe may be of any desired shape and is preferably secured to the arcuate bar 16 by means of two removable bolts as at 33.

In some instances, it may be desirable to provide means for positively preventing turning of shaft 20 and any of the parts connected therewith. To this end, a disc 34 is keyed to the shaft 20, resting on the cross bar 21 and having peripheral notches 35, adapted to be engaged by a pawl 36 continuously urged toward the same through the expansion of a coil spring 37. The engagement and disengagement of the pawl 36 with the notches 35 is automatic as the teeth of both are triangular as shown.

A modified form of the ground shoe 32 is shown in Figures 9 and 10, where bar 16' corresponds to the arcuate bar 16, and removable bolts 33' correspond to those at 33 and secure a shoe 32' to the arcuate bar. In this instance, the shoe preferably has a roller 38 at each end, secured in place by rotatably mounting pinions 39, in bent over lugs 40 on the shoe.

Attention is called to the fact that either shoe 32 or 32' may remain permanently attached to the arcuate bar 16 so that as the plow share 13 raises, the shoe will be automaticaly positioned in contact with the ground through the lowering of the shoe into engagement therewith.

Various changes may be resorted to provided they fall within the spirit and scope of the invention.

I claim as my invention:—

1. A plow of the class described, having a beam, plow share, means pivotally suspending the plow share from said beam, gearing connected to the said means provided with gear teeth, and a worm on the beam at the rear of the plow share engaging said gearing and operable to vary the position of said means to accordingly regulate the position of the plow share.

2. A plow having a beam, a plow share, means pivotaly mounting said plowshare on said beam, an arcuate bar pivotally connected to said means provided with gear teeth, and extending rearwardly therefrom, a worm journaled on to said beam at the rear of the plowshare and geared to said arcuate bar, and means operable to turn said worm to cause said bar to vary the position of the plow.

3. A plow having a beam, plow share, means pivotally mounting said plow share on said beam, an arcuate bar pivotally connected to said means provided with gear teeth, a worm journaled on said beam geared to said arcuate bar, means operable to turn said worm to cause said bar to vary the position of the plow, handlebars connected to said beam and extending upwardly and rearwardly therefrom, a bar connecting said handlebars, and a shaft for said worm journaled in the last-mentioned bar.

4. A plow having a beam, plow share, means pivotally mounting said plow share on said beam, an arcuate bar pivotally connected to said means provided with gear teeth, a worm journaled on said beam geared to said arcuate bar, means operable to turn said worm to cause said bar to vary the position of the plow, handlebars connected to said beam and extending upwardly and rearwardly therefrom, a bar connecting said handlebars, a shaft for said worm journaled in the last-mentioned bar, means between said last-mentioned bar and shaft automatically preventing turning of the shaft accidentally, and an operating crank means on said bar.

5. A plow, having a beam, plow share, means pivotally mounting said plow share on said beam, an arcuate bar pivotally connected to said means provided with gear teeth, a worm journaled on said beam geared to said arcuate bar, means operable to turn said worm to cause said bar to vary the position of the plow, and a ground engaging shoe carried by the arcuate bar and movable into operative position through the raising of the share.

6. A plow having a beam, plow share, means pivotally mounting said plow share on said beam, an arcuate bar pivotally connected to said means provided with gear teeth, a worm journaled on said beam geared to said arcuate bar, means operable to turn said worm to cause said bar to vary the position of the plow, a ground engaging shoe, and means to connect said shoe to said arcuate bar.

7. A plow having a beam, plow share, means pivotally extending the plow share from said beam, gearing connected to the said means, a worm on the beam at the rear of the plow share engaging said gearing and operable to vary the position of said means, handle bar means connected to said beam and extending upwardly and forwardly therefrom, a shaft for said worm, and means connected to the handle bar means journaling said shaft.

RUSSELL H. FLOWERS.